United States Patent [19]

McMaster

[11] Patent Number: 5,230,728
[45] Date of Patent: Jul. 27, 1993

[54] METHOD AND APPARATUS FOR THERMALLY STABLE MOLD ASSEMBLY AND SUPPORT

[75] Inventor: Ronald A. McMaster, Perrysburg, Ohio

[73] Assignee: Glasstech, Inc., Perrysburg, Ohio

[21] Appl. No.: 833,589

[22] Filed: Feb. 10, 1992

Related U.S. Application Data

[63] Continuation of Ser. No. 556,406, Jul. 20, 1990, abandoned.

[51] Int. Cl.$^5$ .................................. C03B 23/03
[52] U.S. Cl. ........................ 65/273; 65/171; 65/289; 65/323
[58] Field of Search ............... 65/171, 181, 273, 287, 65/323, 289, 374.13

[56] References Cited

U.S. PATENT DOCUMENTS

| | | | |
|---|---|---|---|
| 3,713,799 | 1/1973 | McMaster | 65/273 |
| 4,265,650 | 5/1981 | Reese et al. | 65/287 |
| 4,664,692 | 5/1987 | Simomura et al. | 65/374.13 |
| 4,737,182 | 4/1988 | Fecik et al. | 65/323 |
| 4,781,745 | 11/1988 | Mumford | 65/323 |

*Primary Examiner*—Joye L. Woodard
*Attorney, Agent, or Firm*—Brooks & Kushman

[57] ABSTRACT

A mold assembly support (10) is disclosed for providing a self-aligning thermally stable mold support in a glass sheet forming system (12) wherein a reference point within the glass sheet heating furnace (14) is connected to a geometric frame of reference outside the furnace (14). The mold assembly support (10) includes a frame (40) including mold registering members (52,54) which define a stable thermal reference point within the furnace which is maintained in an unchanging relationship with respect to the geometric frame of reference outside the furnace (14) along a glass sheet heating furnace substructure (16).

15 Claims, 2 Drawing Sheets

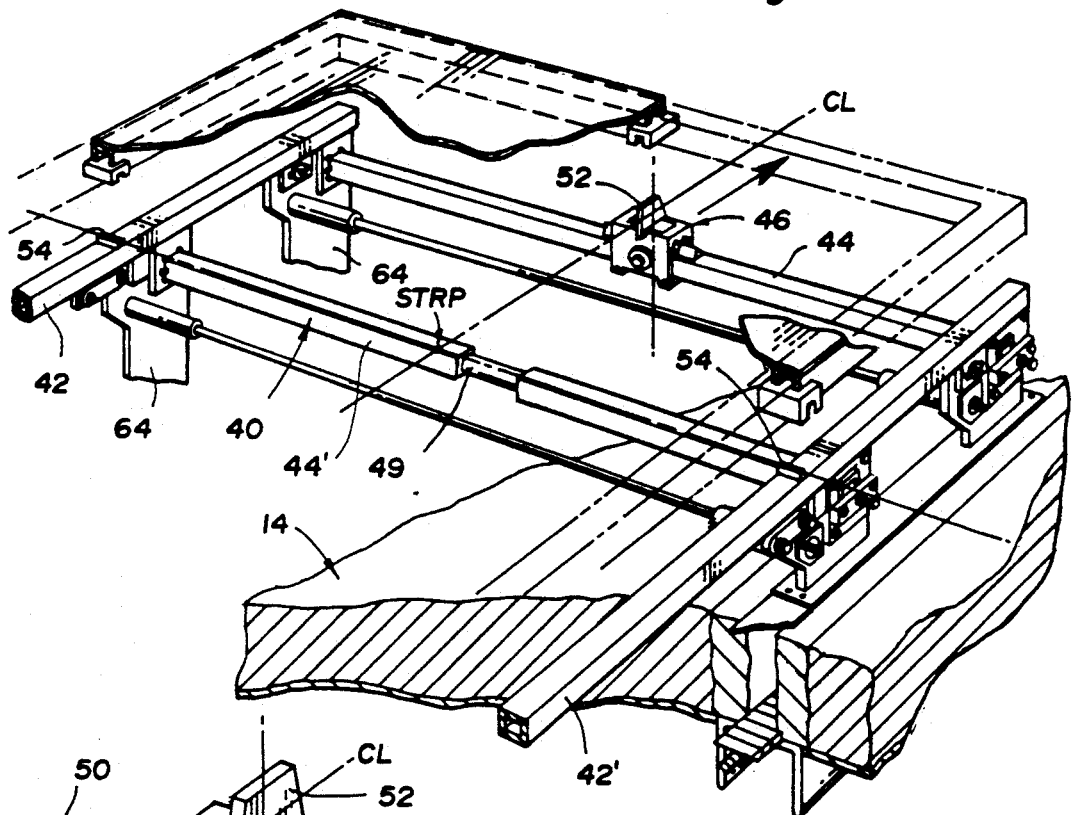
Fig. 2
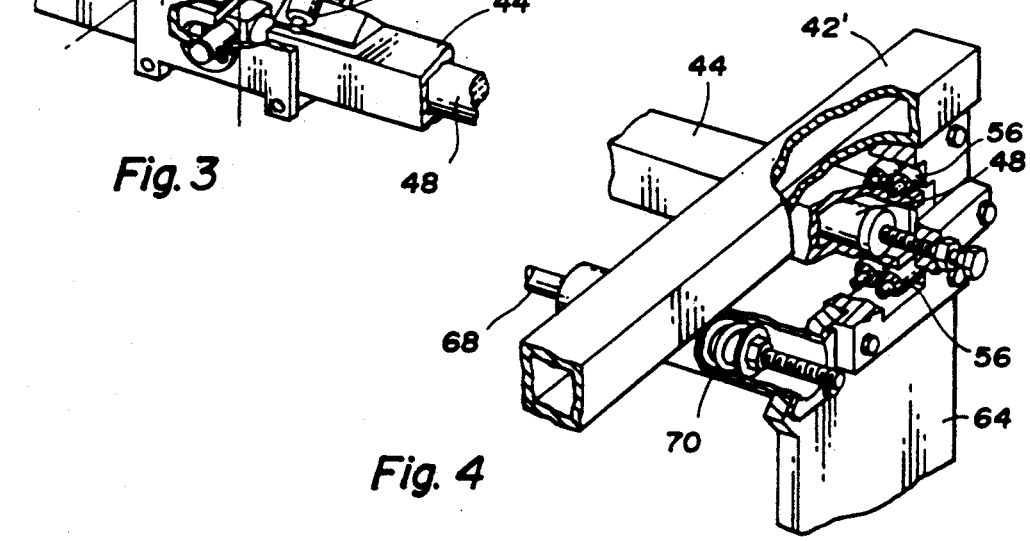
Fig. 3
Fig. 4

METHOD AND APPARATUS FOR THERMALLY STABLE MOLD ASSEMBLY AND SUPPORT

This is a continuation of copending U.S. patent application Ser. No. 07/556,406 filed on Jul. 20, 1990, now abandoned.

TECHNICAL FIELD

This invention relates to method and apparatus providing a thermally stable reference point in a glass sheet forming station and more particularly to a mold support and drive connected to a geometric reference frame outside a glass sheet heating furnace for supporting a glass sheet shaping mold for movement within the glass sheet heating furnace having a forming section.

BACKGROUND ART

In a conventional glass sheet forming system including a furnace having a forming section and a topside support device, a glass sheet is received by the topside support device which includes a downwardly facing surface for receiving the glass sheet prior to release onto a glass sheet shaping tool such as a lower mold used for forming the glass sheet. The glass sheet is supported on the topside support device by vacuum and pressure on the downwardly facing surface prior to being deposited onto the lower mold.

Pressurized gas is used to prevent surface-to-surface contact and to assist in conveying the glass sheet. Inertia of the glass sheet moving in a plane of conveyance in the furnace provides movement of the glass sheet supported on the topside support device into engagement with a suitable mechanical stop mounted on the topside support device. The pressurized gas stream can be inclined to assist the inertia in conveying the glass sheet to engagement with the mechanical stop. A back gate assembly is moved into position at the upstream end of the glass sheet to prevent it from bouncing off the mechanical stop. With the glass sheet so positioned, the vacuum drawn by the topside support device is terminated and the glass sheet is deposited on the lower mold below the topside support device.

The lower mold is then shuttled into the forming section wherein an upper mold, having a downwardly facing shaping surface, engages with the glass sheet on the lower mold imparting a shape to the glass sheet. This system incurs alignment problems as components of the apparatus heat up and undergo thermal expansion. These alignment problems occur at the interface of the topside support device and lower mold and also at the interface of the lower mold and upper mold, resulting in incorrectly formed glass sheets.

To lessen these alignment problems, a plurality of locators as taught in U.S. Pat. No. 4,877,437 are mounted on the lower mold for accurately registering the glass sheet deposited from the topside support device on the lower mold. However, such tooling is expensive and requires high maintenance. Also, because such tooling and support structure are subjected to thermal gradients, the same undergoes thermal expansion and contraction that results in misalignment in the forming section at the interface of the upper and lower molds during engagement thereof.

DISCLOSURE OF THE INVENTION

An object of the present invention is to provide a method and apparatus for an improved mold support and drive that is geometrically thermally stable in an environment of changing thermal gradients.

Another object of the invention is to provide a mold support and drive that maintains an accurate and reproducible geometric frame of reference for forming glass sheets by connecting a thermally stable reference point within a glass sheet heating furnace to a geometric frame of reference outside the furnace.

A further object of the invention is to provide a mold support and drive which generates cost savings by eliminating the need for high cost tooling and long start up periods during a part changeover.

In carrying out the above objects and other objects of the invention, such a method and apparatus for such a mold support and drive is utilized in a glass sheet forming system including a glass sheet heating furnace including a furnace substructure and integral forming section. The forming section includes a topside support device and forming apparatus for forming the heated glass sheet. A lower mold receives the heated glass sheet from the topside support device and shuttles the glass sheet to the forming apparatus.

The mold support includes a frame or linkage that supports the mold and provides a thermally stable reference point within the furnace connected to a geometric frame of reference outside the furnace. The frame includes a pair of spaced longitudinal frame members which define lateral support locations fixed in a geometric frame of reference outside the furnace. The frame also includes a transverse frame member of a metal material mounted between the lateral frame members.

A mold assembly locator defines the lateral position of the thermally stable reference point within the furnace and is mounted on the transverse frame member. The mold assembly locator is cooperably registerable with the mold assembly for mounting the mold on the frame. A fused silica connector is mounted to and extends from one of the lateral frame members and is connected to the mold locator. The fused silica connector, which is unaffected by the temperature levels and thermal gradients encountered in glass sheet heating and cooling, accurately positions the mold locator with respect to the one lateral support location whereby the mold is accurately registerable on the frame and its location about the mold locator is generally unaffected by any thermal gradients or thermal expansion or contraction of the frame members. Preferably, the mold support includes another fused silica connector extending from the other lateral frame member and also connected to the mold locator. The mold locator defining the lateral position of the reference point within the furnace is preferably located on the longitudinal centerline of the furnace.

Mold assembly registering members define the longitudinal position of the thermally stable reference point within the furnace and are mounted on each longitudinal frame member. The mold assembly registering member is cooperatively registered with the mold assembly for mounting the mold on the frame.

The intersection of the longitudinal extension of the mold assembly locator and the lateral extension between the two mold assembly registering members defines the thermally stable reference point within the furnace. The thermally stable reference point is connected to a geometric frame of reference outside of the furnace.

By establishing a thermally stable reference point inside of the furnace relative to a geometric frame of reference outside of the furnace, the position of said point can be reliably known without directly measuring it since its relationship to the geometric frame of reference outside of the furnace is unchanging.

The mold support further includes a drive mechanism, unexposed to the furnace heat, for actuating translational movement of the frame relative to the furnace substructure. That drive mechanism includes guides fixedly mounted to the furnace substructure along each lateral support location. The drive mechanism also includes piers which extend vertically into the shaping section through slots in the furnace floor and that establish the geometric frame of reference outside the furnace in order to carry and support the longitudinal frame members which locate and support the mold assembly.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is a perspective, partially cut-away view of the mold support and drive of FIG. 1;

FIG. 3 is an enlarged, partially cut-away view of a mold locator illustrating its mounting on the mold support; and FIG. 4 is an enlarged, partially cut-away view of a section of the mold support illustrating the construction that compensates for thermal expansion and contraction of the mold support.

BEST MODE FOR CARRYING OUT THE INVENTION

Figure 1:
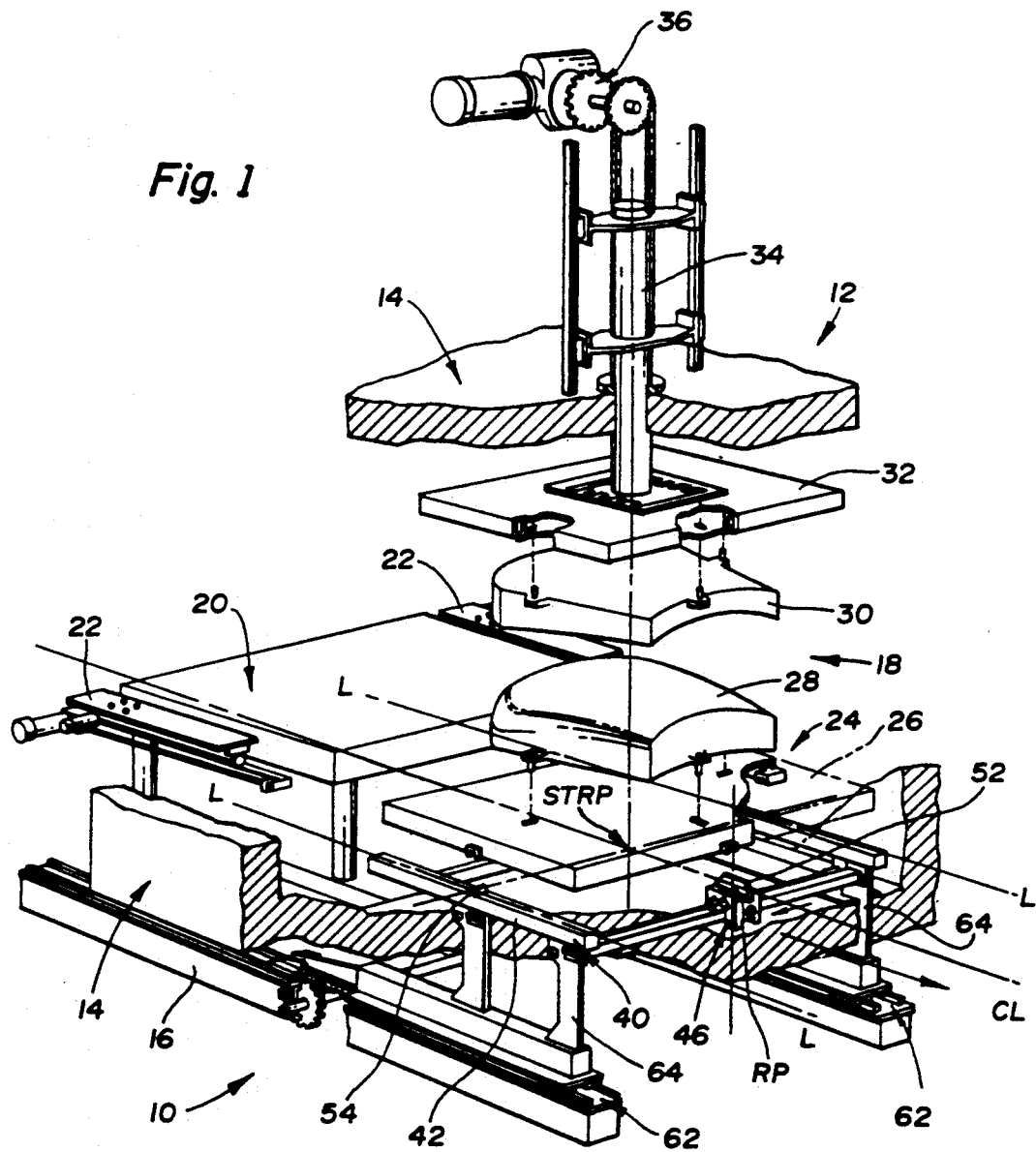
FIG. 1 is a perspective, partially cut-away view of a glass sheet forming system including a glass sheet heating furnace having a forming section and topside support device, illustrating a self-aligning mold support and drive constructed in accordance with the present invention.

Referring to FIG. 1 of the drawings, a mold assembly support and drive constructed in accordance with the present invention is generally indicated by reference numeral 10 and is used in a glass sheet forming system 12. As is hereinafter more fully disclosed, the mold assembly support 10 acts as a mechanical linkage providing a thermally stable reference point within a glass sheet heating furnace connected to a geometric frame of reference outside the furnace to provide a thermally stable frame of reference within the thermally unstable environment of the forming system 12. This thermally stable frame of reference to which glass sheet handling components are referenced allows heated glass sheets to be repeatedly shaped in a production operation. This ability is significant in the production of laminated windshield glass where exacting tolerances are critical as two sheets of formed glass are fit together after the forming.

With reference to FIG. 1 of the drawings, the glass sheet forming system 12 includes a glass sheet heating furnace 14 including a heating conveyor, not shown, for heating a glass sheet. The furnace 14 includes a substructure 16 in a stable ambient environment and integral forming section 18. Forming section 18 includes a topside support device 20 which includes a downwardly facing surface for receiving the heated glass sheet prior to release onto a glass sheet shaping tool. A positioning device 22 accurately locates the heated glass sheet with respect to the downwardly facing surface of the topside support device 20. The forming section 18 also includes a mold assembly 24 comprised of a lower mold backplane 26 and lower full face male mold 28 for receiving the heated glass sheet from the topside support device 20.

An upper female mold 30 supported on an upper mold backplane 32 presses the glass sheet between the lower full face male mold 28 and upper female mold 30 to form the heated glass sheet. An upper mold backplane lifter 34 actuated by an actuator 36 actuates vertical movement of the upper female mold 30.

With reference to FIGS. 1 and 2 of the drawings, the mold assembly support 10 that supports lower mold backplane 26 and lower full face male mold 28 comprises a frame 40 which includes a pair of spaced longitudinally extending lateral frame members 42,42' defining lateral support locations L—L relative to a geometric frame of reference outside the furnace 14 and paralleling the longitudinal axis or centerline CL of the furnace. Frame 40 also includes a transverse frame member 44 mounted between the lateral frame members 42,42'. A mold assembly locator 46 including registering member 52, defines the lateral position of the thermally stable reference point within furnace 14 and best seen in FIG. 3. Registering member 52 is cooperably registerable with the lower mold backplane 26 for accurately mounting the lower mold backplane and lower full face male mold 28 on frame 40 such that male mold 28 is accurately located laterally with respect to the longitudinal axis of furnace 14.

With reference to FIGS. 3 and 4 of the drawings, fused silica connectors 48 and 50, which are generally unaffected by thermal gradients encountered in the heating furnace 14, are mounted and extend from each of the lateral frame members 42 and 42' and clamp the mold locator 46 for accurate lateral positioning of the mold locator with respect to longitudinal axis CL of the furnace. Hereby, the lateral position of the thermally stable reference point within furnace 14 is connected via connectors 48 and 50, to a geometric frame of reference outside the furnace 14 rendering the mold locator 46 inside the furnace thermally stable with respect to the outside of the furnace. Mold locator 46 is thereby maintained in an unchanging spaced relation relative to the lateral support locations.

Frame 40 further includes mold assembly registering members 54 mounted on the lateral frame members 42,42' for fixing the lower mold backplane support 26 and lower mold 28 in the longitudinal direction. Similar registration is disclosed in U.S. Pat. No. 4,781,745 which is hereby incorporated by reference. Together these registration members 52,54, which they lower mold backplane 26 to support 10, provide a stable thermal reference point STRP at the intersection of a longitudinal line through registration element 52 and a transverse line through registering members 54 which accurately aligns mold 26 on the backplane.

Referring again to FIG. 1 of the drawings, a drive mechanism 60 illustrated as a rack and pinion drive, actuates translational movement of frame 40 relative to the furnace substructure 16. Drive 60 is located beneath the forming section 18 in the ambient environment and is generally unaffected by thermal gradients experienced by the frame members 42,42' and 44. Guides 62 are fixedly mounted to the furnace substructure 16 in the ambient environment, and have vertically extending piers 64 mounted thereon lateral, frame members 42, 42' are mounted on piers 64 thereby establishing fixed lateral support locations L—L that are.

As shown in FIGS. 2 and 4, a tensioner 68 has a adjustable spring means 70 and extends between the lateral frame members 42,42'. Spring means 70 preloads the piers 64 against the laterally extending fused silica connectors 48 and 50. As shown in FIG. 2 of the drawings, mold assembly support 10 includes two such tensioners 68. Additionally, the preferred mold assembly support 10 includes a second transverse frame member 44' that also includes a fused silica connector 49 which similarly extends between the lateral frame members 42,42' to provide additional frame structure. Since the two tensioners 68 compress the fused silica rods 48,50 contained within steel tubes 44 and 44', said tubes must be allowed to expand by use of wheels 56 as shown in FIGS. 3 and 4.

The thermally stable mounting of the mold assembly 24 on the mold assembly support 10 by the registration members 52,54 maintains the mold 28 along the same longitudinal and lateral reference connected to the frame of reference outside of the furnace regardless of thermal gradients and assures that each glass sheet received from the topside support device 20 is accurately positioned on full face male mold 28. This accurate positioning of the glass sheet further assures that upper female mold 30 of integral forming section 18 will accurately cooperate with lower mold 28 to provide a reproducible shape in each glass sheet.

While the best mode for carrying out the invention has been described in detail, those familiar with the art to which this invention relates will recognize various alternative designs and embodiments for practicing the invention as defined by the following claims.

What is claimed is:

1. In a glass sheet forming system including a glass sheet heating furnace having a longitudinal axis, a glass sheet shaping mold assembly support within said furnace and longitudinally movable with respect to said furnace, the heating furnace including a substructure defining a frame of reference outside the furnace and comprising:

mold assembly locator means connected to said mold assembly support within said furnace, and means connecting said locator means and the shaping mold assembly support to the frame of reference outside the furnace, said connecting means being longitudinally movable with respect to said frame of reference so that the connecting means is unaffected by thermal gradients or temperature levels during movement with respect to said furnace whereby to establish a thermally stable reference point within the glass sheet heating furnace irrespective of such movement.

2. A support as in claim 1 wherein said connecting means is a fused silica bar.

3. A method of establishing a thermally stable reference point within a glass sheet forming station, including a glass sheet heating furnace including a substructure defining a frame of reference outside the furnace, the method comprising:

connecting a mold assembly locator means within the furnace to a thermally unaffected connecting means which is longitudinally movable with respect to and connected to the frame of reference outside the furnace so that the locator means is unaffected by thermal gradients or temperature levels within the furnace during movement of the locator means with respect to said frame of reference.

4. The method of claim 3 further including the step of connecting a glass sheet shaping mold assembly support to said mold assembly locator to establish a thermally stable reference point on said mold assembly support within the glass sheet heating furnace.

5. A glass sheet forming system comprising: a glass sheet heating furnace having a longitudinal axis and adapted for heating a glass sheet, the furnace including a furnace substructure comprising a frame of reference outside the furnace and integral forming section, the forming section including a topside support device and forming apparatus for forming the heated glass sheet;

a mold assembly for receiving the heated glass sheet from the topside support device and for shuttling the glass sheet to the forming apparatus;

a frame that supports the mold assembly, said frame including a pair of spaced longitudinally extending lateral frame members defining lateral support locations connected to said frame of reference outside the furnace, and said frame also including a transverse frame member mounted between said lateral frame members;

a mold assembly locator defining the lateral position of a thermally stable reference point within the furnace mounted on said transverse frame member, said mold assembly locator being cooperably registerable with the mold assembly for mounting the mold assembly on said frame;

a mold assembly registering member defining the longitudinal position of the thermally stable reference point mounted on each said lateral frame member, said mold assembly registering member being cooperably registerable with the mold assembly for mounting the mold assembly on said frame; and a fused silica connector mounted within said transverse frame member and connected with and extending from each of said lateral frame members and connected to said mold locator, thereby connecting the mold locator to said lateral frame members and thereby to the lateral support locations connected to the frame of reference outside the furnace to establish the lateral position of the thermally stable reference point within the furnace, said fused silica connector accurately positioning said mold locator with respect to said lateral support locations, and said mold assembly registering members defining the longitudinal position of the thermally stable reference point cooperating with said mold locator whereby the mold assembly is accurately located on said frame about the thermally stable reference point and its location thereon is maintained with respect to the frame of reference outside of the furnace and the mold assembly positioning is generally unaffected by any thermal expansions or contractions.

6. A forming system as in claim 5 further including a drive mechanism for actuating translational movement of said frame relative to the furnace substructure comprising said frame of reference outside the furnace.

7. A forming system as in claim 6 wherein said drive mechanism is located beneath the forming section in the ambient environment and is generally unaffected by thermal expansions or contractions.

8. A forming system as in claim 7 wherein said drive mechanism includes guides fixedly mounted to the furnace substructure along said lateral support locations and having vertically extending piers which mount said longitudinally extending lateral frame members for movement.

9. A forming system as in claim 8 further including a tensioner having adjustable spring means and extending between said lateral frame members for preloading the piers against the fused silica connectors.

10. A forming system as in claim 9 further including first and second mounts; said first mount rigidly connecting one lateral frame member and said transverse frame member, and said second mount movably connecting the other of said one lateral frame members to said transverse frame member thereby allowing expansion and contraction of said transverse frame member from said first mount.

11. A forming system as in claim 10 further including a second transverse frame member extending between said longitudinally extending lateral frame members.

12. A forming system as in claim 11 further including a third fused silica connector mounted within said second transverse frame member and connected to and extending between said lateral frame members.

13. A forming system as in claim 11 further including a second tensioner having adjustable spring means extending between said lateral frame members.

14. A forming system as in claim 7 wherein said drive mechanism is defined by a rack and pinion assembly.

15. A glass sheet forming system comprising:
   a glass sheet heating furnace having a longitudinal axis and adapted for heating a glass sheet, the furnace including a furnace substructure comprising a frame of reference outside the furnace and integral forming section, the forming section including a topside support device and forming apparatus for forming the heated glass sheet;
   a mold assembly for receiving the heated glass sheet from the topside support device and for shuttling the glass sheet to the forming apparatus;
   a drive mechanism mounted in the ambient and including guide members defining lateral support locations connected to said frame of reference outside the furnace along the furnace substructure for moving the mold assembly;
   a frame that supports the mold assembly between the lateral support locations;
   a mold assembly locator defining the lateral position of a thermally stable reference point within the furnace mounted on said frame, said mold assembly locator being cooperably registerable with the mold assembly for mounting the mold assembly on said frame;
   a mold assembly registering member defining the longitudinal position of the thermally stable reference point mounted on each said lateral support locations, said mold assembly registering member being cooperably registerable with the mold assembly for mounting the mold assembly on said frame; and
   a fused silica connector mounted to said frame and connected with and extending from said lateral support locations and connected to said mold locator thereby connecting the frame of reference outside the furnace, the thermally stable reference point being defined by the intersection of extensions of the said lateral and longitudinal positions within the furnace to accurately position said mold assembly locator on said frame whereby its location relative to the lateral support locations is generally unaffected by thermal expansions or contractions.

* * * * *